United States Patent [19]

DeBaun et al.

[11] Patent Number: 4,594,888
[45] Date of Patent: Jun. 17, 1986

[54] AIRFLOW MEASURING SOUND ATTENUATOR

[75] Inventors: Kenneth W. DeBaun, Santa Rosa, Calif.; Robert H. Morris, Randolph, N.J.

[73] Assignee: Air Monitor Corporation, Santa Rosa, Calif.

[21] Appl. No.: 703,025

[22] Filed: Feb. 19, 1985

[51] Int. Cl.[4] .......................... G01F 1/46; G01F 15/00
[52] U.S. Cl. .................................. 73/198; 73/861.63; 73/861.66
[58] Field of Search ...................... 73/195, 198, 861.61, 73/861.63, 861.64, 861.65, 861.66

[56] References Cited

U.S. PATENT DOCUMENTS

| | | | |
|---|---|---|---|
| 1,702,274 | 2/1929 | Schmidt | 73/861.66 X |
| 2,332,694 | 10/1943 | Campbell | 73/861.63 |
| 2,336,209 | 12/1973 | Anderson | 73/198 |
| 2,760,371 | 8/1956 | Borden | 73/861.63 |
| 4,425,807 | 1/1984 | Victor | 73/861.66 X |
| 4,509,371 | 4/1985 | Wellman | 73/861.63 X |

*Primary Examiner*—Herbert Goldstein

[57] ABSTRACT

An airflow measuring sound attenuator that profiles and stabilizes the pattern of air flowing out of attenuation throats and accurately measures the average velocity of air flowing through the attenautor by a pitot tube array mounted in the region of profiled and stabilized airflow.

1 Claim, 6 Drawing Figures

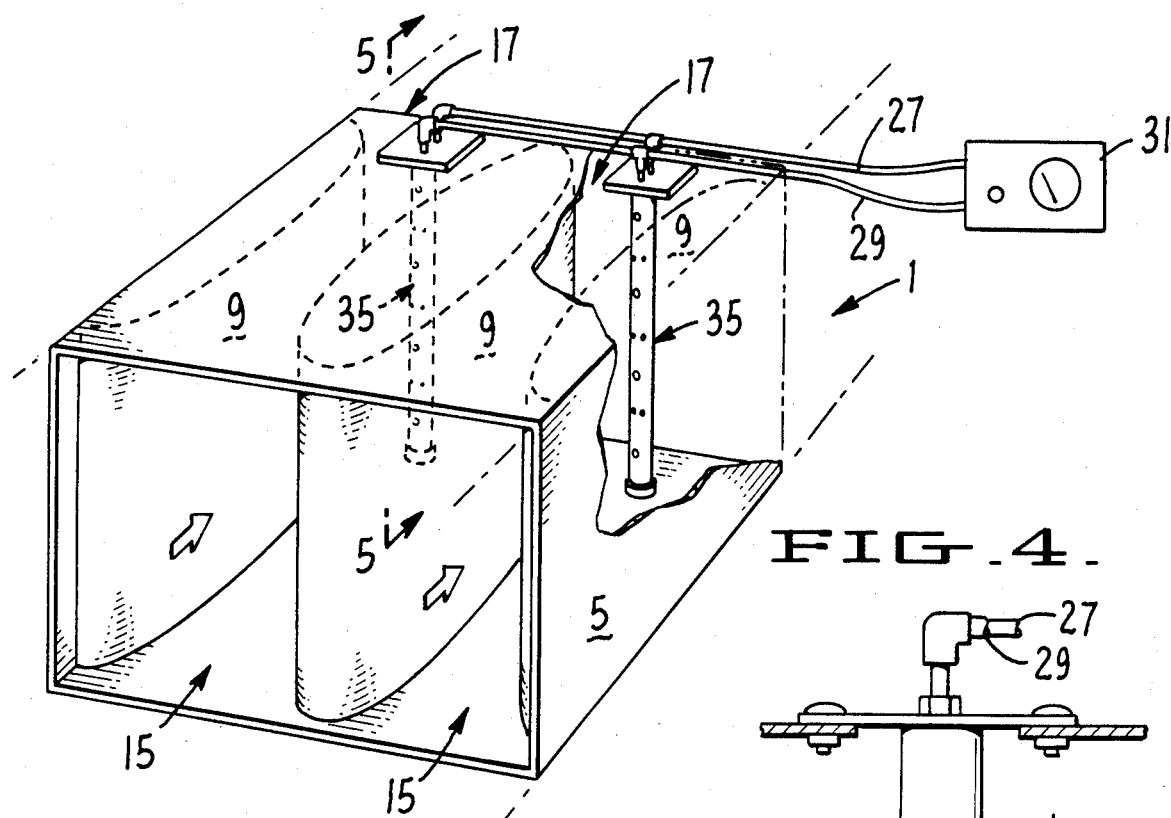
FIG. 4.
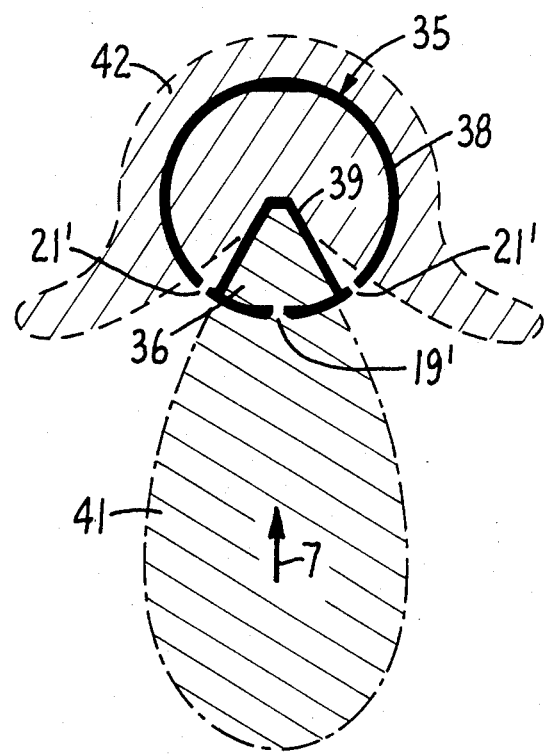
FIG. 6.
FIG. 5.

AIRFLOW MEASURING SOUND ATTENUATOR

This invention relates generally to means for reducing acoustic noise and for measuring airflow in heating, ventilating and air conditioning duct systems and more particularly to the combination of air velocity measuring means with the flow stabilizing and profiling capability inherent in sound attenuators.

BACKGROUND OF THE INVENTION

Various devices have been used to minimize turbulent flow in duct systems so that accurate flow measurements can be made. Most of these include honeycomb-type straightening sections oriented axially with the duct and bulk airflow to straighten the otherwise turbulent flow pattern. These straightening sections must be placed in adequately long, straight runs of duct or conduit which frequently are not available in modern air conditioning duct work. Typical of prior art arrangements are the flow measuring stations disclosed in U.S. Pat. Nos. 3,685,355 and 3,733,900 issued to Kenneth W. DeBaun; U.S. Pat. No. 3,981,183 issued to Roger T. Goulet; and U.S. Pat. No. 4,297,900 issued to Robert O. Brandt. All use honeycomb-type flow straightening means in combination with a pitot tube array that measures air velocity by separately sensing static and total pressure in a traverse downstream of the honeycomb.

Even where the airflow has been straightened, it frequently does not have an equalized profile across the duct so that it is necessary to take a large number of velocity samples across the duct in order to get a true average value of velocity and, thus, an accurate determination of the quantity of airflow. Profiling of the airflow pattern to equalize it across the duct sometimes has been accomplished by shaped honeycomb sections such as is illustrated in U.S. Pat. No. 3,964,519 issued to Kenneth W. DeBaun.

SUMMARY OF THE INVENTION

Sound attenuators have been used primarily as sound traps to reduce the passage of noise through a duct by virtue of their restrictive flow capacity, particularly in high velocity and low pressure variable volume air conditioning systems or those which use axial vane fans. The present invention makes use of the discovery that the convergent and divergent parabolic throats used as sound attentuators in duct systems create a repetitive, predictable airflow pattern and profile at the divergent outlet throats even at differing airflow rates. Velocity measuring means mounted at one or more of the diverging outlet throats of the attenuator in that region of repetitive, predictable profile obtain an average velocity measurement with fewer samples than has been possible with honeycomb air straighteners of the prior art.

In addition, the sound attenuator provides such relatively high impedance to airflow that airflow velocities in the channel openings are usually 100% higher than an unobstructed duct passage. Since a higher pressure differential signal is then obtainable as a measure of velocity, that signal is superior for readout or control purposes. Thus, the resultant improvements derived by locating velocity measuring devices in the outlet throats or channel openings of the attenuator combine to make the measurement of air volume (based upon velocity and uniformity of air flow) more accurate.

One object of the invention is to utilize the sound attenuator profiling and flow pattern stabilizing capability to establish a plane of uniform airflow across a duct in which a reliable average air velocity can be measured for accurate measurement of the bulk airflow in a duct or conduit.

Another object of the invention is to employ the efficient profiling capability of a sound attenuator so that fewer sensors are necessary to achieve accurate average flow measurements.

One other object of the invention is an arrangement of components for retrofitting existing sound attenuator installations for accurate flow measurement, particularly where straight duct runs are not available.

Other features and advantages of the invention will become apparent upon consideration of the following description of specific embodiments and the accompanying drawings.

BRIEF DESCRIPTION OF THE DRAWINGS

FIG. 4 is a perspective view of the same form of sound attenuator with a combined total and static pressure sensing probe mounted within the attenuator throats;

FIG. 5 is an elevational view of one of the probes of FIG. 4 taken along line 5—5; and FIG. 6 is a horizontal cross-sectional view of the probe taken at line 6—6 of FIG. 5 showing its internal construction and the air pressure pattern surrounding it.

DESCRIPTION OF THE PREFERRED EMBODIMENTS

Figure 1:
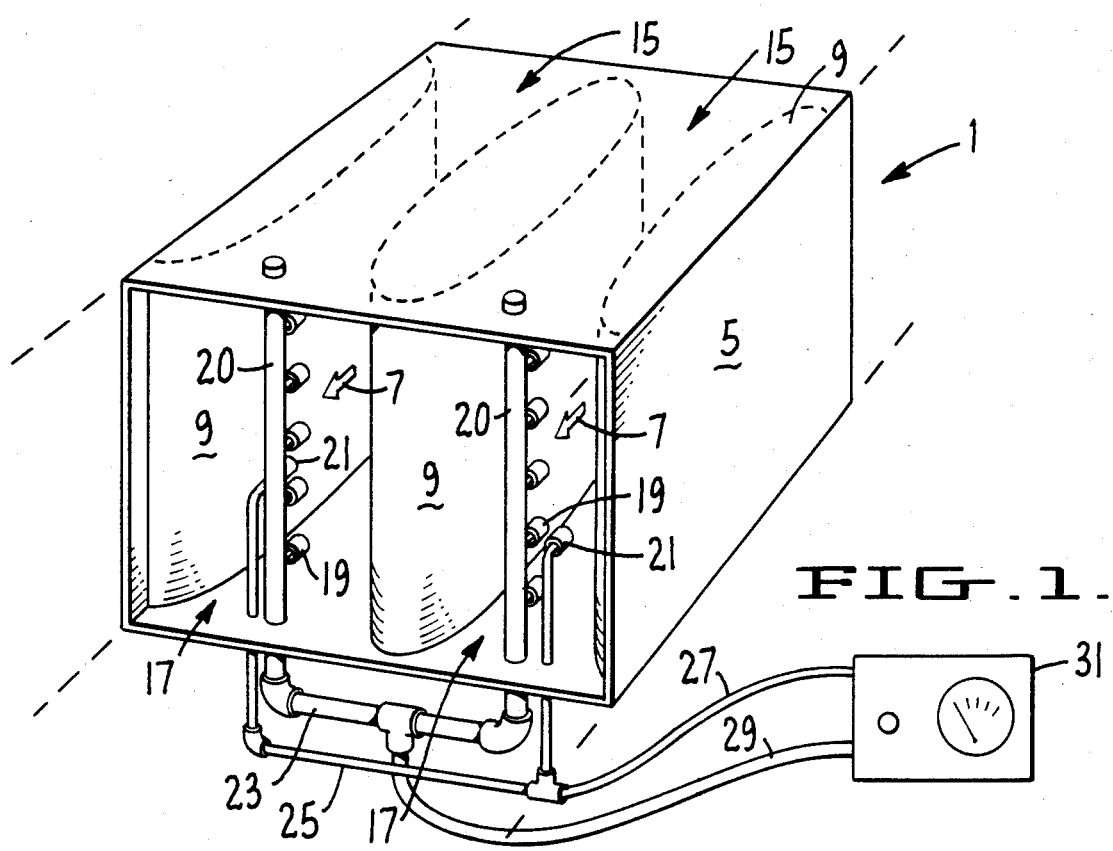
FIG. 1 is a perspective view of one form of sound attenuator with a shrouded array of total pressure sensors and a separate static pressure sensor within the divergent attenuator throats.

FIG. 1 illustrates generally a duct system 1 in hidden lines in which is mounted the casing 5 of a sound attenuator. Air flows through the attenuator as shown by direction arrows 7 between parabolically shaped baffles 9 which in the described embodiment define between them convergent inlet throats 15 and divergent outlet throats 17.

In the embodiment of FIG. 1 an array of total pressure sensors 19 opens upstream toward the air flowing out the divergent outlet throats 17 as shown by arrows 7. These total pressure sensors 19 are manifolded together by manifold tube 20 so as to average the total pressure transversely, as shown, vertically across the throat. The average pressure in manifold tube 20 communicates through tubing 23 and 29 to a differential pressure measuring or transmitting or indicating device such as manometer 31.

The static pressure at approximately the plane of the total pressure sensors 19 within the divergent outlet throats is sensed by static pressure sensors 21. Conduits 25, 27 communicate the static pressure to the other side of the manometer 31.

As is described in the various patents cited hereinbefore, the differential of the static and total pressures across the measuring plane is a measurement of air velocity across that plane. That velocity times the known cross-sectional area at the plane of sensor traverse is the volume of airflow per unit of time.

Figure 2:
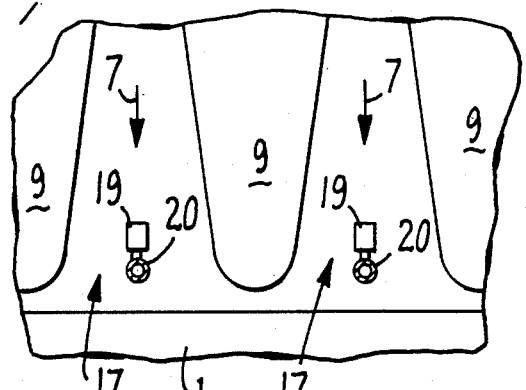
FIG. 2 illustrates placement of the sensors within the throats as in FIG. 1.
Figure 3:
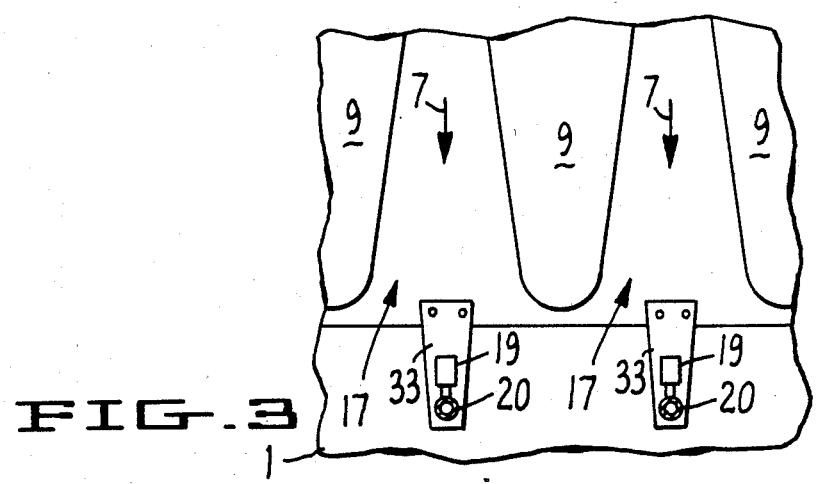
FIG. 3 illustrates an alternate placement of the sensors slightly downstream of the attenuator throats.

FIG. 2 illustrates the pressure sensors of FIG. 1 as they are shown in FIG. 1 within the divergent outlet throats 17 of the attenuator that are defined between parabolic baffles 9. FIG. 3 illustrates an alternative array of sensors 19, 21 mounted downstream of the divergent outlet throats 17 on plates 33. In both examples, they are placed in the region of profiled and stabilized airflow developed by the attenuator.

FIG. 4 illustrates the same sound attenuator casing 5 mounted within duct 1 in which sets of baffles 9 having generally parabolic surfaces define between them convergent inlet throats 15 and divergent outlet throats 17. Within each divergent outlet throat 17 of the silencer mounts a unitary probe 35 of the type more particularly disclosed and described in Kenneth W. DeBaun application Ser. No. 522,338, filed on Aug. 11, 1983, now abandoned. Each unitary probe 35 comprises an array of spaced total pressure sensing ports 19' which perforate the leading edge of the probe 35 and communicate as shown in FIG. 6 with one another by means of an internal manifold tube 36 to average the total pressure across the array. Internal manifold tube 36 is defined within the exterior tube 38 of the probe by an internal baffle 39. Corresponding arrays of spaced static pressure sensing ports 21' are formed in and manifolded by the exterior tube 38 at an angle of about 40° to the direction of airflow 7 they sense and average the static pressure across the array.

As is more particularly described in application Ser. No. 522,338, the pressure distribution around the probe is a positive pressure in the region indicated at 41 and a negative pressure in the region indicated as 42. The spaced static pressure ports 21' are located at the line of 0 pressure at about 40° to the direction of bulk airflow. The spaced total pressure sensing ports 19' are located along the airflow axis 7 on the leading edge of the probe at the point of maximum pressure.

Variations will be apparent from the exact structural embodiments shown. For instance, a rectangular duct has been illustrated whereas the sound attenuators may be circular or oval. Similarly, specific arrays of total and static pressure sensors have been shown. Various others such as those in the patents identified above could be substituted within the scope of the appended claims.

I claim:

1. An airflow measuring sound attenuator for air flowing through a duct comprising baffles within the duct defining at least one divergent outlet throat and a velocity measuring means at said divergent throat in the region of profiled and stabilized duct airflow, said velocity measuring means being spaced downstream from the throat outlet outside said attenuator.

* * * * *